United States Patent [19]
Iguchi et al.

[11] Patent Number: 5,896,120
[45] Date of Patent: Apr. 20, 1999

[54] PREVENTING NOISE IN A COORDINATE INPUT DEVICE BY REDUCING OR SUSPENDING BACKLIGHT OSCILLATION VOLTAGE

[75] Inventors: Shigeki Iguchi, Ikoma-gun; Katsumi Hirano, Yamatokouriyama, both of Japan

[73] Assignee: Sharp Kabushiki Kaisha, Japan

[21] Appl. No.: 08/863,621

[22] Filed: May 27, 1997

Related U.S. Application Data

[63] Continuation of application No. 08/329,261, Oct. 26, 1994, abandoned.

[30] Foreign Application Priority Data

Nov. 5, 1993 [JP] Japan ................................. 5-276527

[51] Int. Cl.$^6$ ................................................. G09G 3/02
[52] U.S. Cl. ..................... 345/102; 345/183; 345/210; 345/211; 345/212; 345/213
[58] Field of Search ........................ 178/87; 315/169.3; 331/64; 345/102, 104, 210–213, 179, 180–183

[56] References Cited

U.S. PATENT DOCUMENTS

| | | | |
|---|---|---|---|
| 3,886,311 | 5/1975 | Rodgers et al. | 178/18 |
| 4,131,864 | 12/1978 | Kuzumoto et al. | 331/64 |
| 4,865,425 | 9/1989 | Kobayashi et al. | 345/102 |
| 4,988,837 | 1/1991 | Murakami et al. | 178/18 |
| 5,144,203 | 9/1992 | Fujita et al. | 315/169.3 |
| 5,187,655 | 2/1993 | Post et al. | 364/146 |
| 5,357,266 | 10/1994 | Tagawa | 345/104 |
| 5,386,219 | 1/1995 | Greanias et al. | 345/179 |
| 5,410,329 | 4/1995 | Tagawa et al. | 345/104 |
| 5,430,462 | 7/1995 | Katagiri et al. | 345/104 |
| 5,442,373 | 8/1995 | Nomura et al. | 345/104 |
| 5,448,024 | 9/1995 | Kawaguchi et al. | 178/18 |
| 5,491,706 | 2/1996 | Tagawa et al. | 345/104 |
| 5,495,263 | 2/1996 | Dalton et al. | 345/213 |

FOREIGN PATENT DOCUMENTS

| | | |
|---|---|---|
| 62-84328 | 4/1987 | Japan . |
| 4-256921 | 9/1992 | Japan . |
| 4-333126 | 11/1992 | Japan . |
| 5-80921 | 4/1993 | Japan . |

Primary Examiner—Mark K. Zimmerman
Assistant Examiner—Vincent E. Kovalick

[57] ABSTRACT

A d.c. voltage is supplied to an inverter power source to drive a light source. Light from the light source is directed uniformly from the back side of a liquid crystal panel. When an image is displayed on the liquid crystal panel during a display period and a position detection pen is in close proximity to the liquid crystal panel at a position detection period, coordinates are calculated according to an induced voltage by the position detection pen and the timing of applying a scanning voltage to an electrode of the liquid crystal panel. The driving of the light source by the inverter power source is suspended or reduced during the position detection period, so that noise from the inverter power source is prevented from being mixed into the position detection pen.

14 Claims, 9 Drawing Sheets

PREVENTING NOISE IN A COORDINATE INPUT DEVICE BY REDUCING OR SUSPENDING BACKLIGHT OSCILLATION VOLTAGE

This application is a continuation of application Ser. No. 08/329,261 filed on Oct. 26, 1994, now abandoned.

BACKGROUND OF THE INVENTION

1. Field of the Invention

The present invention relates to coordinate input devices. More particularly, the present invention relates to a coordinate input device including a back light such as an electrostatic capacitance system or electromagnetic induction system tablet.

2. Description of Background Art

Figure 7:
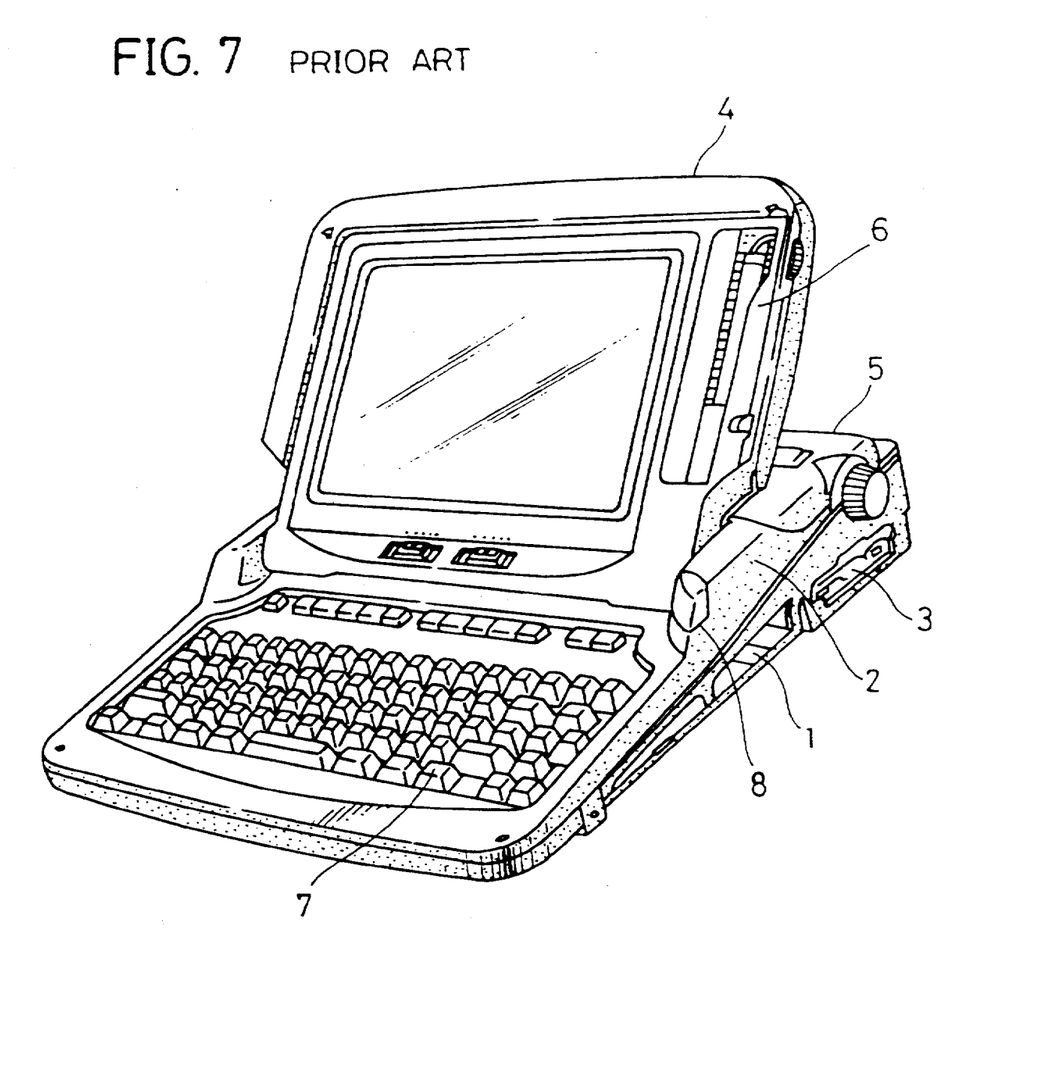
FIG. 7 is an appearance of a convention Japanese word processor that allows coordinate input.
Figure 8:
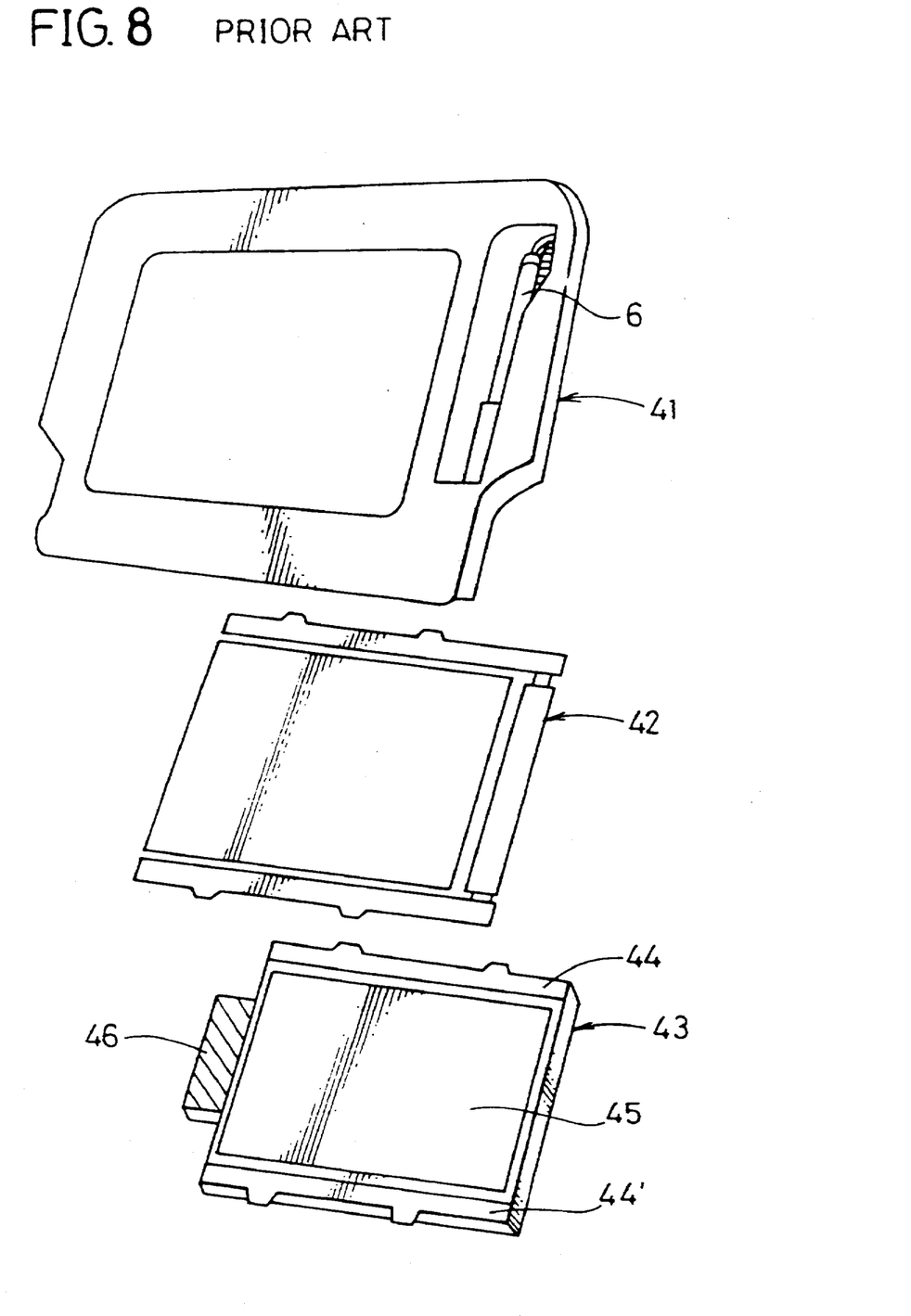
FIG. 8 is a perspective view showing the structure of the display unit shown in FIG. 7.

FIG. 7 shows an appearance of a conventional Japanese word processor that allows coordinate input, and FIG. 8 is a perspective view of the conventional word processor of FIG. 7 showing the structure of a display unit thereof.

Referring to FIG. 7, a Japanese word processor includes a lower cabinet 1 and an upper cabinet 2. The lower cabinet 1 includes a floppy disc drive 3. The upper cabinet 2 includes a display unit 4, a printer 5, a pen 6, a keyboard 7, and a ten-key light receiving unit 8. The pen 6 serves to detect a coordinate position on the display unit 4.

Referring to FIG. 8, the display unit 4 includes a display cabinet 41 in which the pen 6 can be placed, a liquid crystal unit 42, and a back light unit 43. The back light unit 43 has lamp holders 44 and 44' provided at the top portion and the bottom portion, respectively, with a light-guiding plate 45 provided therebetween. An inverter 46 is provided at the left side of the back light unit 43. The inverter 46 oscillates a high voltage to drive a lamp (not shown) held by lamp holder 44. Light from this lamp is directed from beneath the liquid crystal 42 by the light-guiding plate 45.

Figure 9:
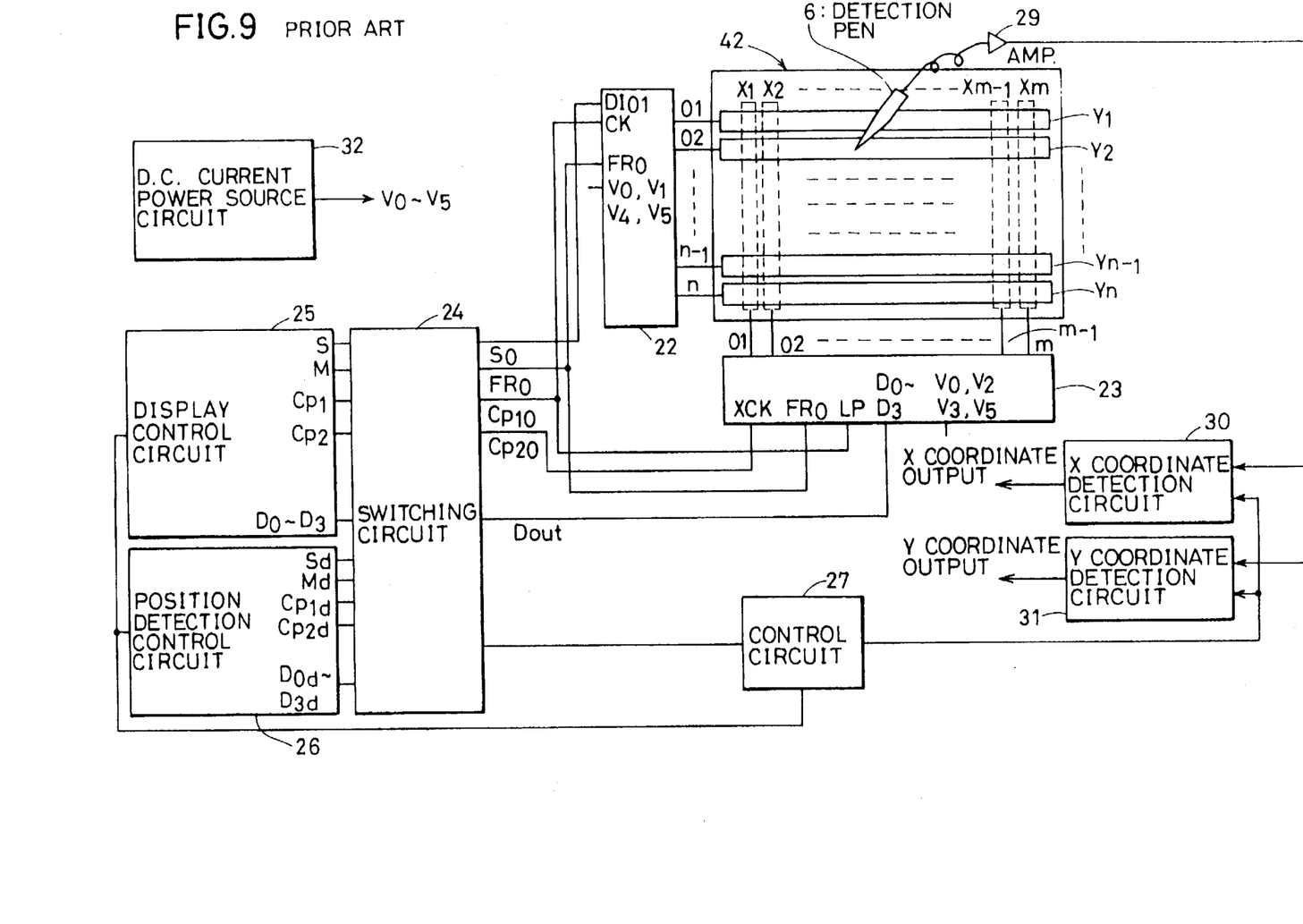
FIG. 9 is a block diagram of a device for driving the display unit shown in FIG. 8 and for detecting a coordinate position specified by a pen.
Figure 10:
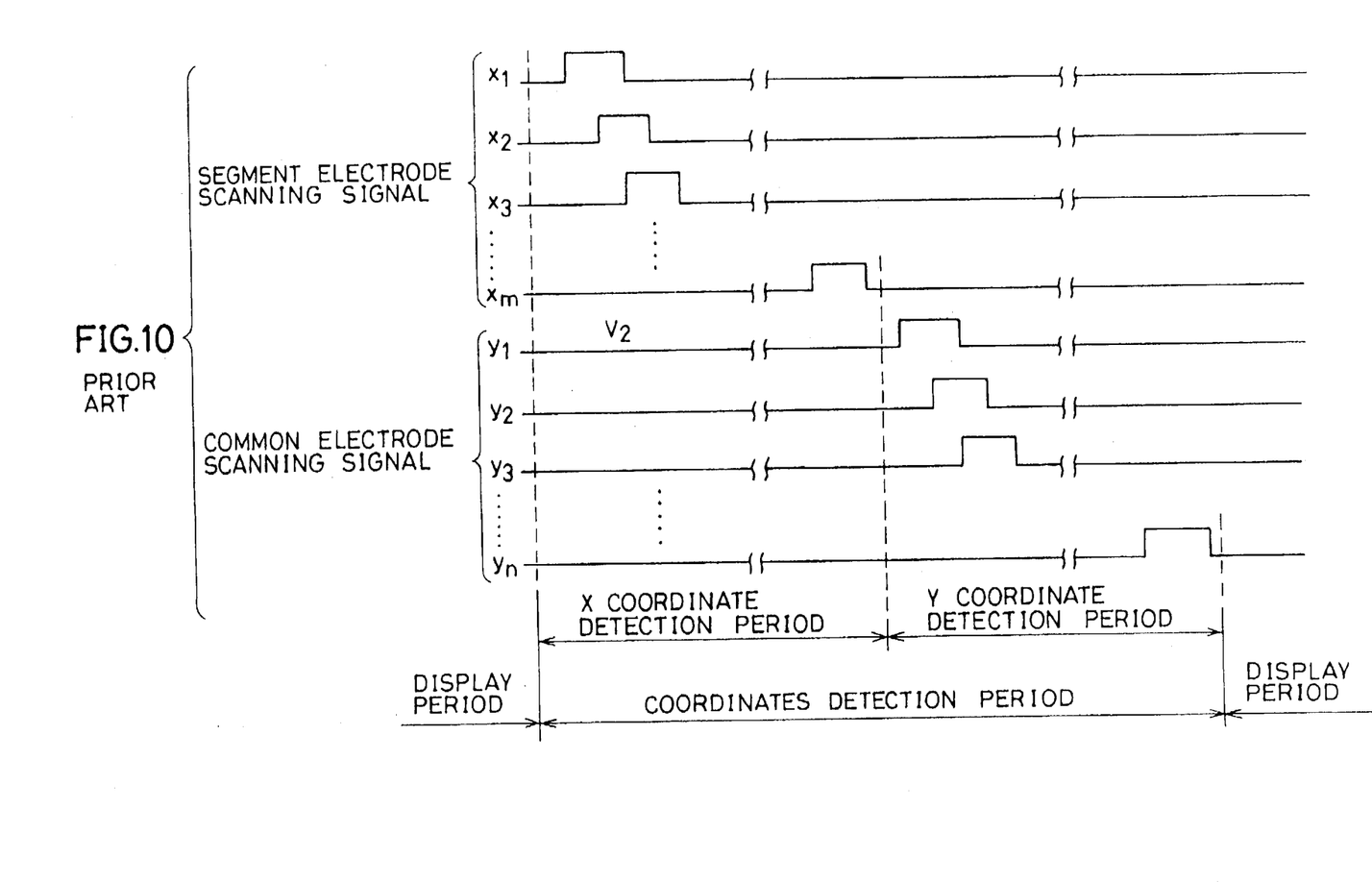
FIG. 10 is a timing chart showing a display period of the liquid crystal unit and a coordinate detection period in the circuit shown in FIG. 9.

FIG. 9 is a block diagram of a coordinate input device for driving the display unit of FIG. 8 and for detecting a coordinate position indicated by the pen. FIG. 10 is a timing chart showing the periods of the liquid crystal unit display and coordinate detection according to the circuitry shown in FIG. 9.

The electrical configuration of the coordinate input device will be described hereinafter. Referring to FIG. 9, the liquid crystal unit 42 is formed with a liquid crystal layer between common electrodes Y1–Yn (referred to as "Y" hereinafter) and segment electrodes X1–Xm (referred to as "X" hereinafter). The portion of the liquid crystal where each common electrode Y and each segment electrode X cross each other is a pixel. The common electrodes Y are driven by a common driving circuit 22. The segment electrode X is driven by a segment driving circuit 23. The common driving circuit 22 and the segment driving circuit 23 are connected to a display control circuit 25 and a position detection control circuit 26 via a switching circuit 24. The switching circuit 24 is controlled by a control circuit 27 to provide an output from the display control circuit 25 during a display period and an output from the position detection control circuit 26 during a position detection period to driving circuits 22 and 23.

During a display period, the display control circuit 25 provides a start signal S, and an inversion signal M, clock signals CP1 and CP2, and display data D0—D3. The scanning period for scanning pixels of one row is the cycle of the clock signal CP1. The clock signal CP1 is applied to the common driving circuit 22 and the segment driving circuit 23 via the switching circuit 24. The start signal S indicates the start of a scanning period for display. The start signal S is provided from the switching circuit 24 to be applied to the common driving circuit 22 in synchronization with the clock signal CP1.

In response to a shift of the clock signal CP1, a driving signal is provided to the common electrodes Y from an output terminal of the common driving circuit 22 corresponding to the shift position. This driving signal is produced according to bias voltages V0–V5 supplied from the power source circuit 32. The scanning period for scanning one column of pixels is divided into a plurality of periods, which is one cycle of the clock signal CP2. The clock signal CP2 is provided via the switching circuit 24 to be applied to the segment driving circuit 23.

Display data D0–D3 are output via the switching circuit 24 to be applied to the segment driving circuit 23 to be sequentially fetched into a register therein. When display data corresponding to one row of pixels are fetched, these display data are latched at the timing of the clock signal CP1, whereby a driving signal corresponding to each display datum is output from an output terminal of the segment driving circuit 23 to segment electrodes X. This driving signal is produced according to bias voltages V0–V5 supplied from the power source circuit 32. The inversion signal M cyclically inverts the polarity of the voltage applied to the liquid crystal to prevent degradation of the liquid crystal caused by the hysteresis.

Pixels of the liquid crystal panel 42 are driven according to their respective row sequence by operations of the common driving circuit 22 and the segment driving circuit 23, whereby a pixel corresponding to the display data is displayed on the liquid crystal panel 42.

During a coordinate detection period, the position detection control circuit 26 provides a start signal Sd, an inversion signal Md, clock signals CP1d and CP2d, and driving data D0d–D3d. The scanning period for scanning one row of common electrodes Y is the cycle of the clock signal CP1d. The clock signal CP1d is applied to the common driving circuit 22 and the segment driving circuit 23 via the switching circuit 24. The start signal Sd indicates start of scanning of common electrodes Y. The start signal Sd is provided via the switching circuit 24 to be applied to the common driving circuit 22 in synchronization with the clock signal CP1d. In response to a shift of the clock signal CP1d, a scanning signal is provided to common electrodes Y from an output terminal of the common driving circuit 22 corresponding to the shift position. This scanning signal is produced according to bias voltages V0–V5 supplied from the power source circuit 32.

The scanning period for scanning one column of segment electrodes X is the cycle for the clock signal CP2d. The clock signal CP2d is applied form the switching circuit 24 to the segment driving circuit 23. Driving data D0d–D3d provided via the switching circuit 24 are applied to the segment driving circuit 23 to be sequentially fetched into an internal register thereof. When driving data corresponding to one row of segment electrodes X are fetched, these driving data are latched a the timing of the clock signal CP1d, whereby a driving signal corresponding to each driving data is provided from an output terminal of the segment driving circuit 23 to segment electrodes X. This driving signal is produced according to bias voltages V0–V5 supplied from the power source circuit 32. The inversion signal Md cyclically quickly inverts the polarity of the voltage applied to the liquid crystal to prevent degradation of the liquid crystal caused by electrolysis.

When the pen 6 approaches the surface of the liquid crystal panel 42, voltage is induced at the electrode of the position detection pen 6 due to a stray capacitance between the electrode provided at the tip of the position detection pen 6 and electrodes X and Y of the liquid crystal panel 42 to which voltages are applied. The voltage induced in the pen 6 is amplified by an amplifier 29 to be applied to an X coordinate detection circuit 30 and a Y coordinate detection circuit 31. The X and Y coordinate detection circuits 30 and 31 calculate the X and Y coordinates, respectively, according to the generation timing of an induced voltage in the pen 6 and a timing signal from the control circuit 27.

Figure 11:
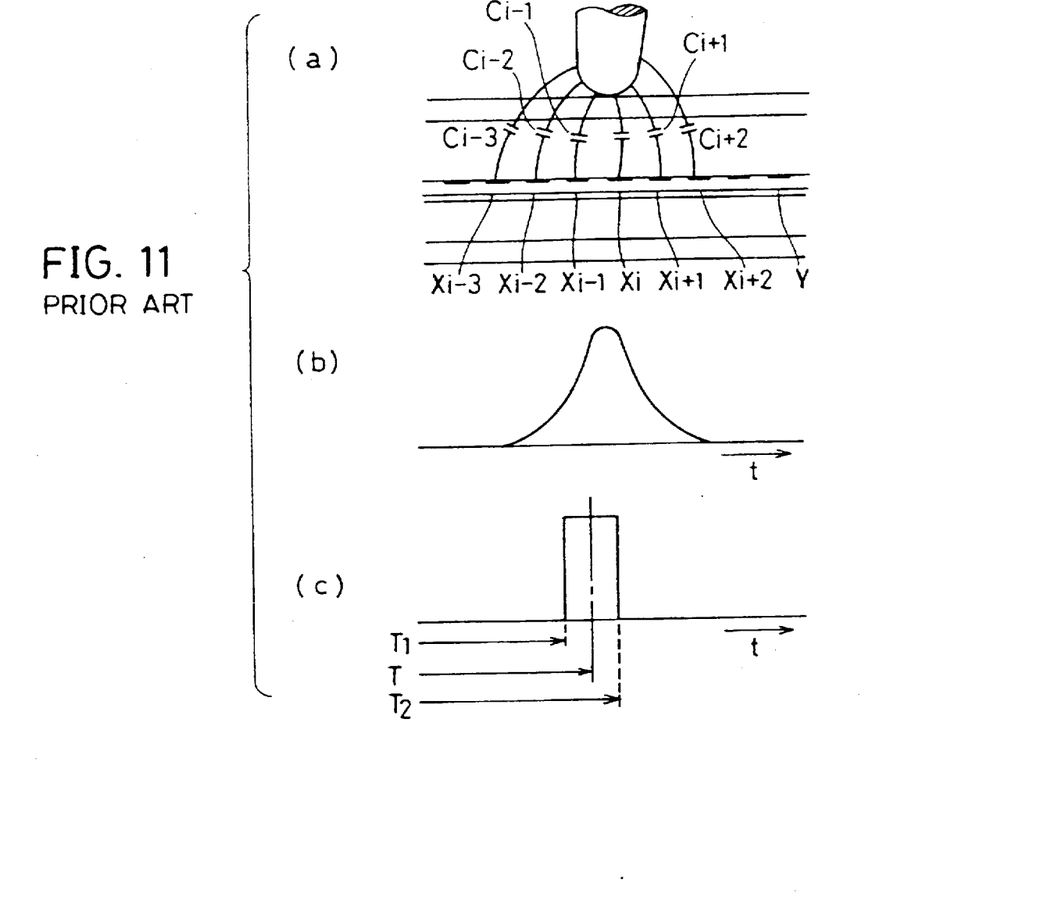
FIG. 11 is a diagram for describing an operation of coordinate detection by a pen.

FIG. 11 is a diagram for describing a coordinate detection operation by the position detection pen 6.

As described in conjunction with FIG. 9, a detecting electrode of high impedance is provided at the tip of the pen 6. When the pen 6 is in closed proximity to the display surface which is the detection panel surface, a small capacitance is formed between the electrodes of the panel and the pen 6 as shown in FIG. 11(a). When a pulse voltage is applied to the electrode of the panel, a small voltage is induced at the electrode of the pen 6 as shown in FIG. 11(b) by electrostatic induction. Because this induced voltage shows a peak value when a scanning voltage is applied to the electrode right beneath the pen 6, the position of the pen 6 can be identified by sequentially applying a scanning voltage from the edge of the display electrode group to calculate the timing until the peak value is achieved.

Figure 12:
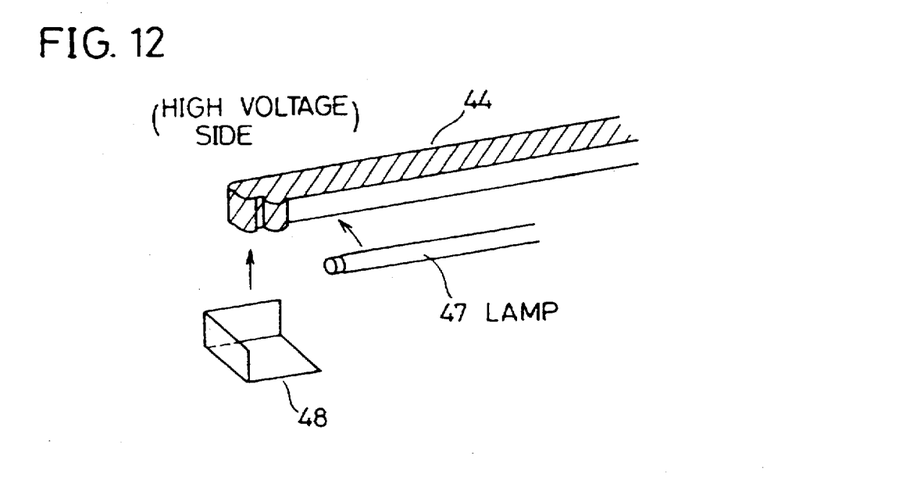
FIG. 12 is a diagram showing the main parts of a back light and a lamp.

The lamp held by the lamp holder 44 of the back light unit 43 is driven by the inverter 46. There is a possibility of erroneous operation in the coordinate detection due to a high voltage generated by the inverter 46 and noise from the inverter to enter from the wiring and the high voltage terminal of the lamp into the tip of the pen 6 to be taken as noise. In order to prevent such erroneous operation, a conductive coating is applied at the hatched outside portion of the lamp holder 44 as shown in FIG. 12 to provide a shield or enclosing the display element side at the high voltage side of the lamp 47 with a shield plate 48 to prevent the tip of the pen 6 from catching noise. The cable connecting the pen 6 with the lamp 29 is shielded.

However, this provision of a shield increases the cost, and complete shielding could not be achieved even if the lamp holder 44 and the inverter 46 are enclosed by a shield plate.

SUMMARY OF THE INVENTION

In view of the foregoing, a main object of the present invention is to provide a coordinate input device that suppresses lighting of a back light in coordinate detection to improve the signal-to-noise ratio, S/N.

In brief, a coordinate input device of the present invention includes a liquid crystal panel with a liquid crystal layer between a plurality of segment electrodes and a plurality of common electrodes orthogonal to each other, a light source for emitting light uniformly from the back side the of liquid crystal panel, an inverter power source for driving the light source, and an electrode driving circuit for driving a segment electrode and a common electrode. A display control circuit controls the electrode driving circuit during a display period for displaying an image on the liquid crystal panel. A position detection pen couples statically a segment electrode and a common electrode. A position detection control circuit controls the electrode driving circuit during a position detection period set subsequent to the display period to apply a scanning voltage sequentially. A coordinate calculation circuit calculates coordinates according to an induced voltage at the position detection pen and the timing of applying a scanning voltage to an electrode. A light source drive suspension circuit suspends the drive of the light source by the inverter power source only during the position detection period.

According to the present invention, by suspending the drive of the light source by the inverter power source only during the position detection period, noise from the inverter power source can be prevented from being mixed into the position location pen to improve the S/N.

More preferably, the power source drive suspension circuit suspends the drive of the light source only when the position detection pen is used and only during the position detection period.

According to another aspect, a coordinate input device of the present invention includes a liquid crystal panel, a light source, an inverter power source, an electrode driving circuit, a display control circuit, a position detection pen, a position detection control circuit, a coordinate calculation circuit, and a voltage reducing circuit for reducing an oscillation voltage of the inverter power source only during the position detection period.

The foregoing and other objects, features, aspects and advantages of the present invention will become more apparent from the following detailed description of the prevent invention when taken in conjunction with the accompanying drawings.

DESCRIPTION OF THE PREFERRED EMBODIMENTS

Figure 1:
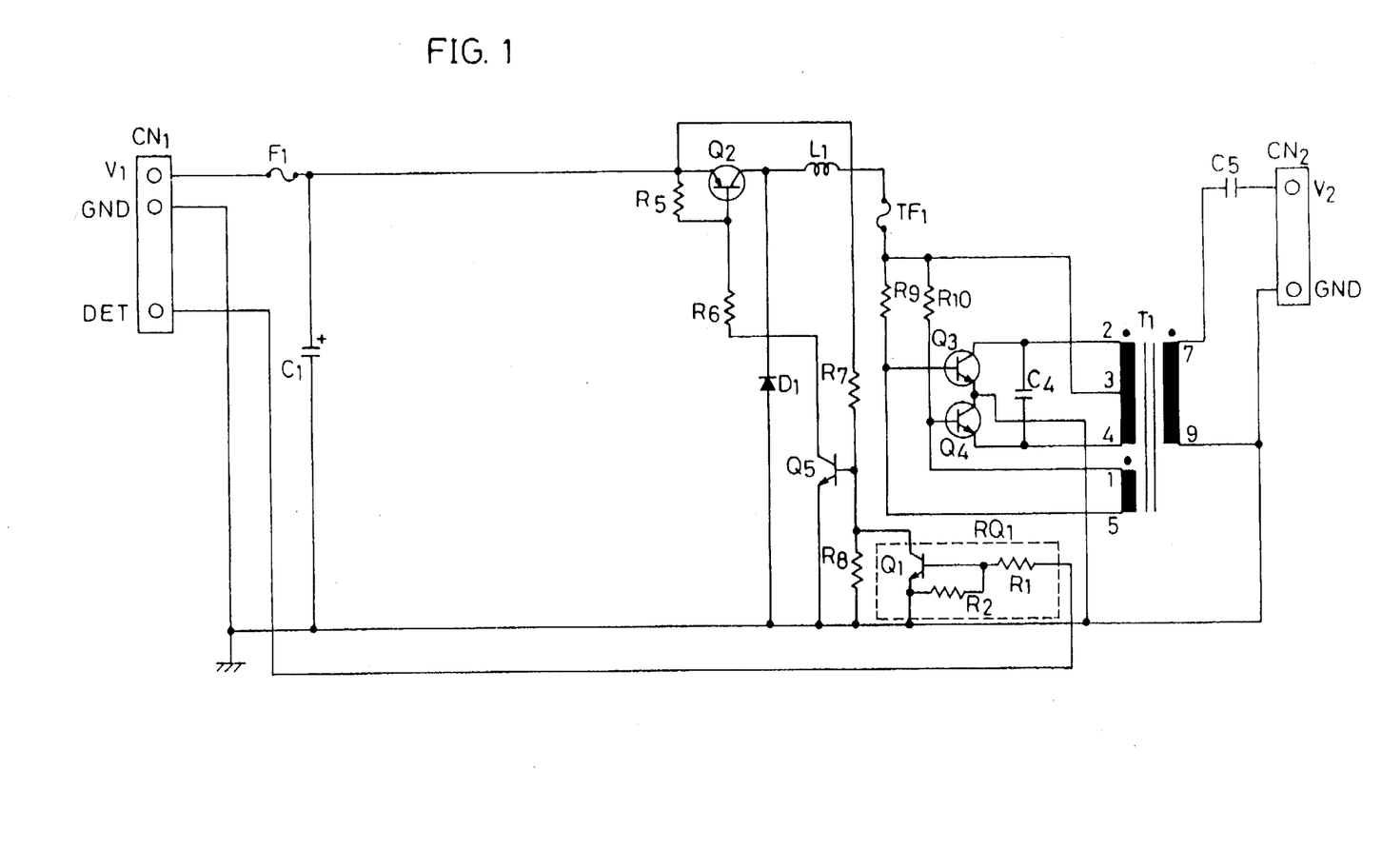
FIG. 1 is an electric circuit diagram of an embodiment of the present invention.

FIG. 1 is a circuit diagram of an inverter according to an embodiment of the present invention. The embodiment shown in FIG. 1 has the oscillation of the inverter suspended only during a tablet coordinate detection period.

Referring to FIG. 1, a connector CN1 includes a terminal to which a d.c. voltage V1 is applied, a ground terminal GND, and a terminal to which a signal DET indicating a tablet coordinate detection period is applied. The d.c. voltage V1 is applied to the base of a transistor Q5 via one end of a fuse F1, one end of a capacitor C1, the emitter of a transistor Q2, one end of a resistor R5, and a resistor R7. The other end of the capacitor C1 is grounded. The other end of a resistor R5 is connected to the base of the transistor Q2, and to the collector of the transistor Q5 via a resistor R6. The emitter of the transistor Q5 is grounded. The collector of the transistor Q2 is grounded via a diode D1, and is connected to a terminal 3 of a transformer T1 via a coil L1 and a fuse TF1, and to respective one ends of resistors R9 and R10. The base of the transistor Q5 is grounded via a resistor R8. The other end of the resistor R9 is connected to the base of the transistor Q3 and a terminal 5 of the transformer T1. The other end of the resistor R10 is connected to the base of the transistor Q4 and a terminal 1 of the transformer T1. The collector of the transistor Q3 is connected to a terminal 2 of the transformer T1. The emitter of the transistor Q3 and the collector of the transistor Q4 are grounded. A capacitor C4 is connected between the collector of the transistor Q3 and the emitter of the transistor Q4.

The signal DET applied to the connector CN1 is provided to the base of the transistor Q1 via the resistor R1. The base of the transistor Q1 is grounded via the resistor R62. The combination of the resistors R1, R2 and the transistor Q1 form a circuit RQ1. The emitter of the transistor Q1 is grounded, and the collector of the transistor Q1 is connected to the base of the transistor Q5.

One terminal 7 of the secondary side of the transformer T1 is connected to a terminal of a connector CN2 via a capacitor C5. An oscillation voltage of V2 is output from this terminal Another terminal 9 at the secondary side of the transformer T1 is grounded and connected to GND terminal of the connector CN2.

Figure 2:
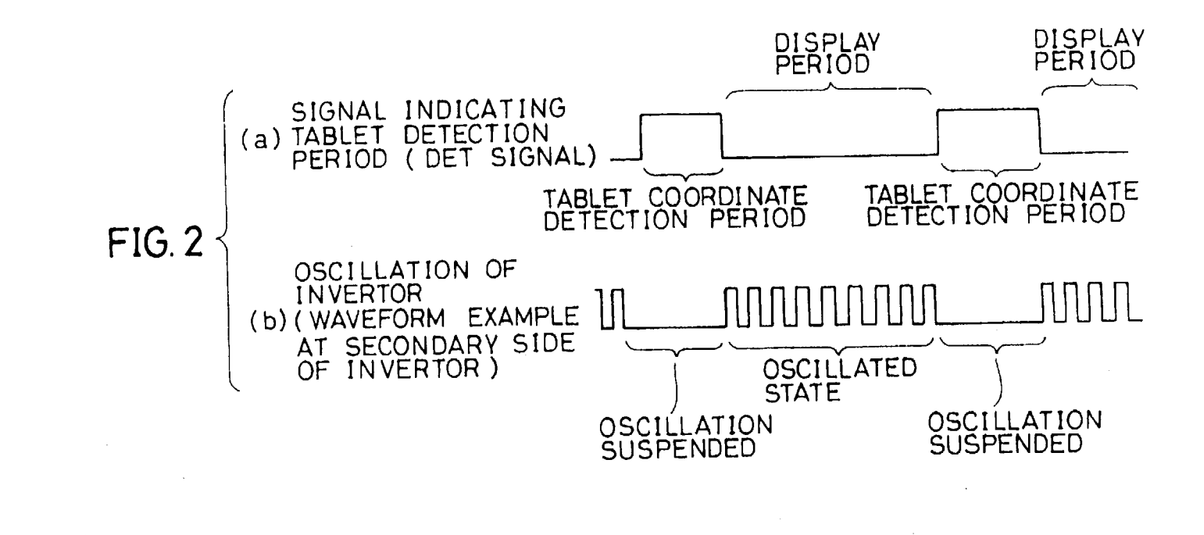
FIG. 2 is a timing chart for describing the operation of FIG. 1.
Figure 3:
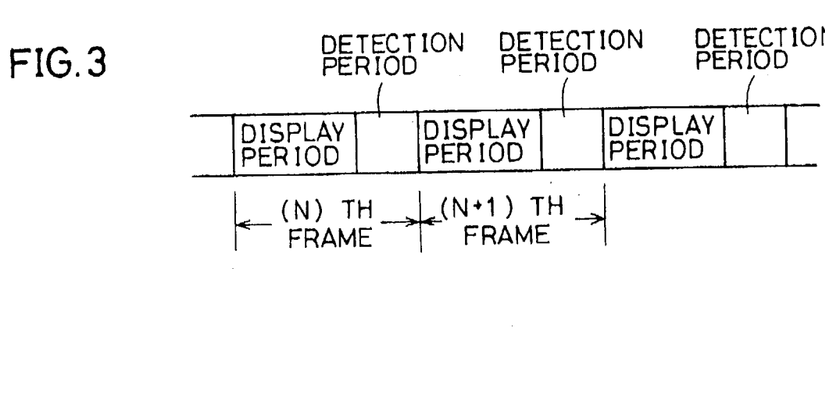
FIG. 3 is a diagram showing a display period and a detection period in each frame.

FIGS. 2 and 3 are timing charts for describing the operation of the circuitry of FIG. 1.

As shown in FIG. 2(a), the signal DET attains a low level L during a display period of the Nth frame in FIG. 3. This signal DET is applied to the base of the transistor Q1 via the resistor R1 to turn off the transistor Q1. The d.c. voltage V1 is voltage-divided by resistors R7 and R8. The divided voltage is applied to the base of transistor Q5, whereby transistor Q2 is turned on. The d.c. voltage V1 is also applied to each base of transistors Q3 and Q4 via resistors R9 and R10, respectively, from the coil L1 and the fuse TF1. According to the functions of transistors Q3 and Q4, the capacitor C4 and the transformer T1, transistors Q3 and Q4 are turned on and off alternately, whereby the inverter initiates an oscillation operation. As a result, an oscillation voltage V2 is output from the secondary side of the transformer T1 as shown in FIG. 2(b).

When the signal DET attains a light level H at a tablet coordinate detection period as shown in FIG. 2(a), the transistor Q1 is turned on and the base of the transistor Q5 attains a ground potential. Therefore, the transistor Q5 is turned off. This causes the base potential of the transistor Q2 to be increased, whereby the transistor Q2 is turned off. Because the d.c. voltage V1 is no longer applied to transistors Q3 and Q4, the oscillator operation is suspended. This suspension of an oscillation operation of the inverter during a tablet coordinate detection period suppresses lighting of the lamp, so that noise can be prevented from being mixed into the tip of detection pen 6. Then, the signal DET is pulled down to a low level L again in the display period of the N+1st frame, whereby the inverter initiates an oscillation operation as shown in FIG. 3.

Figure 4:
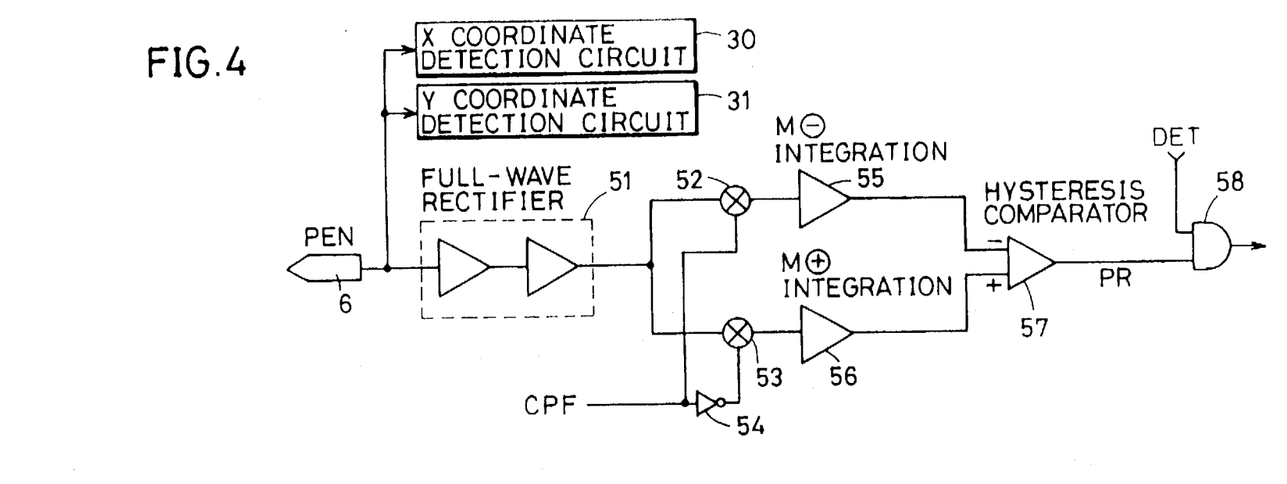
FIG. 4 is an electric circuit diagram according to another embodiment of the present invention.
Figure 5:
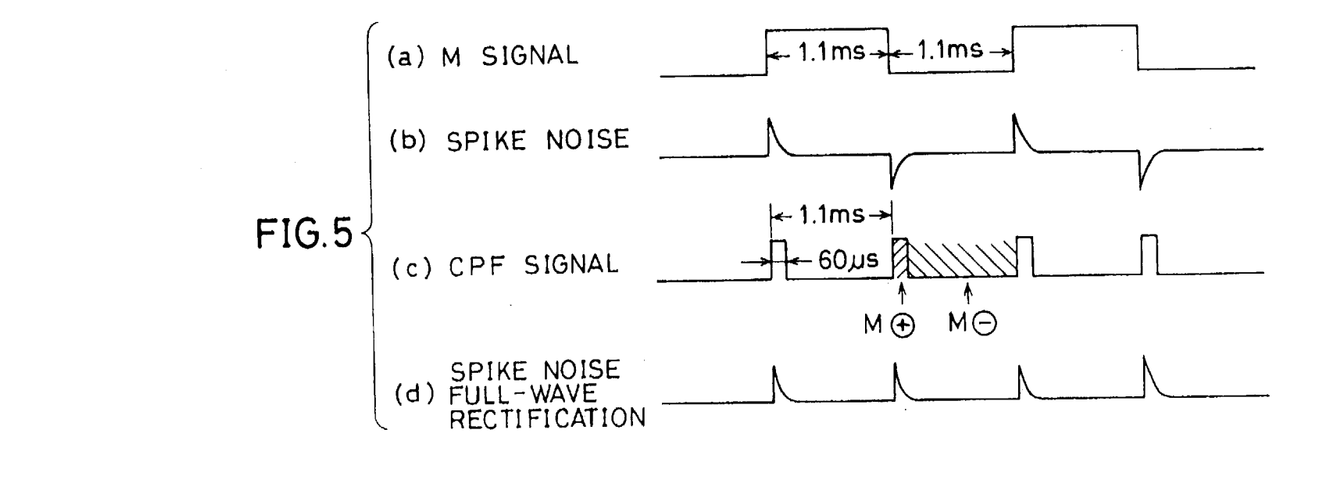
FIG. 5 is a timing chart for describing an operation of the embodiment of FIG. 4.

FIG. 4 is a block diagram of another embodiment of the present invention; and FIG. 5 is a timing chart for describing the operation of FIG. 4.

In the embodiment shown in FIG. 4, the pen 6 approaches the liquid crystal panel 42, and oscillation of the inverter is suspended only during the tablet coordinate detection period similar to that of FIG. 1. Detection of the pen 6 approaching the liquid crystal panel 42 is carried out as set forth in the following.

As described in conjunction with the conventional embodiment of FIG. 9, the voltage applied to each display dot is alternated by an M signal as shown in FIG. 5(a) in order to prevent degradation of the liquid crystal of the liquid crystal panel 42. This voltage is detected as a spike noise shown in FIG. 5(b) by the pen 6. Detection of the spike noise indicates that the pen 6 is approaching the liquid crystal panel 42. An output of the pen 6 is applied to an X coordinate detection circuit 30 and Y coordinate detection circuit 31, as well as to a full-wave rectifier circuit 51. The full-wave rectifier circuit 51 full-wave rectifies the spike noise detected by the pen 6 as shown in FIG. 5(d). The rectified noise is applied to gate circuits 52 and 53. The gate circuit 52 receives a CPF signal shown in FIG. 5(c), and the gate circuit 53 receives a CPF signal inverted by an inverter 54.

As shown in FIG. 5(c), the CPF signal synchronizes with the M signal, and attains an H level for the length of 60 μsec to provide spike noise to an integration circuit 55. The gate circuit 53 is opened only when the CPF signal attains an L level to provide a spike noise to an integration circuit 56. The integration circuit 55 integrates the full-wave rectified spike noise with M− period. The integration circuit 56 integrates the full-wave rectified spike noise by M+ period. The respective integrated outputs are provided to a hysteresis comparator 57.

When the integrated value of the M+ period becomes greater than the integrated value of the M− period by a certain value, the hysteresis comparator 57 changes its output from an L level to an H level, and provides a PR signal indicating that the pen 6 is in proximity to the liquid crystal panel 42. This PR signal is applied to an AND gate 58 in which the logical product with the DET signal described in conjunction with FIG. 1 is obtained. More specifically, the AND gate 58 suspends oscillation of the inverter of FIG. 1 when the PR signal attains a high level H indicating the pen 6 is close to the liquid crystal panel 42 and the DET signal attains a high level H.

Figure 6:
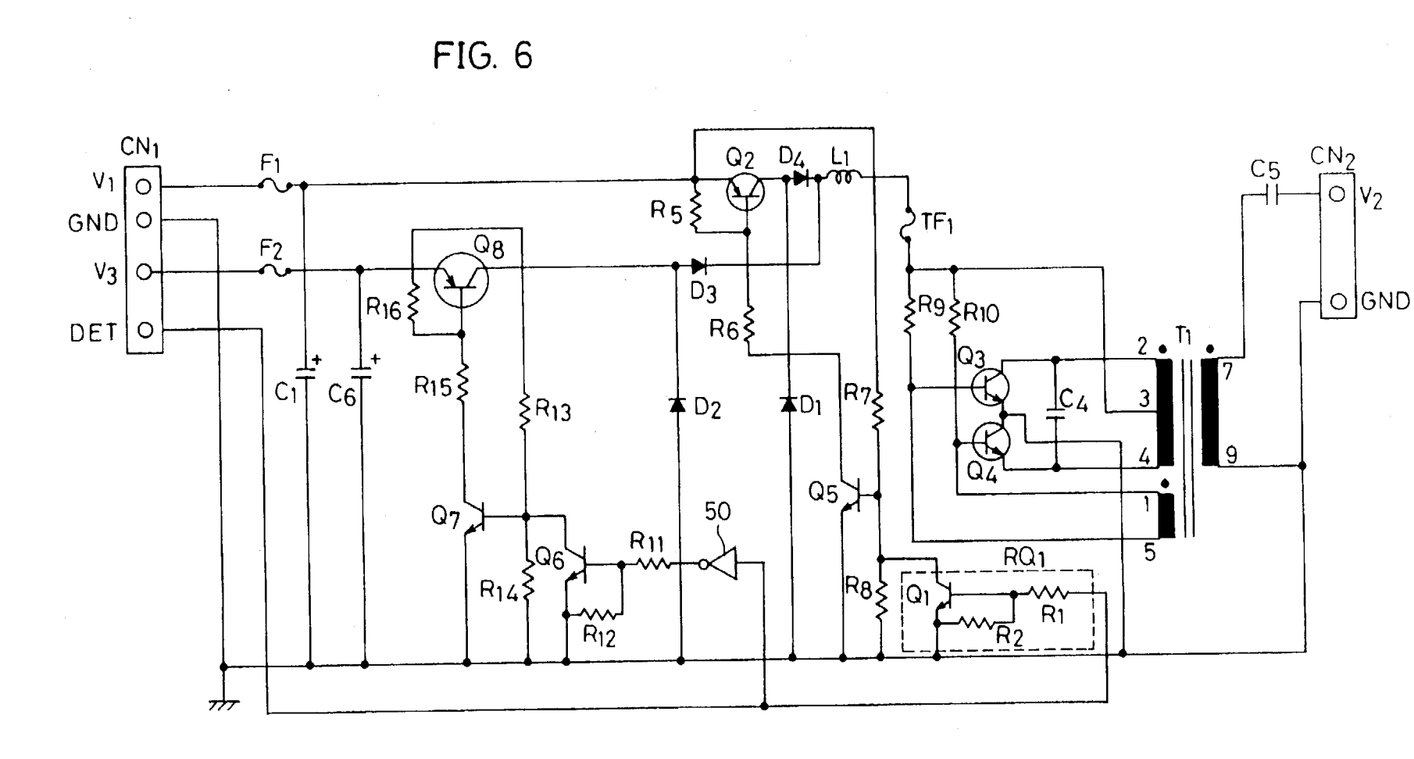
FIG. 6 is an electric circuit diagram of another embodiment of the present invention.

FIG. 6 is a circuit diagram of a further embodiment of the present invention. In contrast to the embodiment of FIG. 1 where the oscillation operation of the inverter is suspended during a table coordinate detection period, the present embodiment has the inverter oscillated by a relatively low voltage during a table coordinate detection period.

The embodiment of FIG. 6 includes the following components in addition to those shown in FIG. 1. A d.c. voltage V3 that is lower than the d.c. voltage V1 is applied to the connector CN1. The d.c. voltage V3 is applied to one end of a capacitor C6 and to the emitter of a transistor Q8 via a fuse F2. The other end of the capacitor C6 is grounded. The DET signal is inverted by an inverter 50 to be applied to the base of a transistor Q6 via a resistor R11. A resistor R12 is connected between the base of the transistor Q6 and ground. The collector of the transistor Q6 is connected to the base of a transistor Q7. The base of the transistor Q7 receives a voltage which is the d.c. voltage V3 divided by resistors R13 and R14. The collection of the transistor Q7 is connected to the base of a transistor Q8 via a resistor R15. A resistor R16 is connected between the base and emitter of the transistor Q8. The emitter of the transistor Q7 is grounded. The collector of the transistor Q8 is connected to one end of the coil Li via a diode D3 for preventing reverse current. A diode D4 for preventing reverse current is connected between one end of the coil L1 and the collector of the transistor Q2. A diode D2 is connected between the collector of the transistor Q8 and ground.

The operation of the embodiment shown in FIG. 6 will be described hereinafter. Because the transistor Q1 is OFF as described in FIG. 1 when the DET signal attains a low level L as shown in FIG. 2, the transistor Q5 is turned on according to the divided voltage by resistors R7 and R8 to turn on the transistor Q2. As a result, the d.c. voltage V1 is applied to transistors Q3 and Q4 via the transistor Q2, whereby transistors Q3 and Q4 oscillate to supply an oscillation voltage of V2 from the connector CN2 to the lamp.

Because the DET signal is inverted by the inverter 50 to attain a high level H, the transistor Q6 is turned on to establish a short-circuit across the resistor R14. As a result, transistors Q7 and Q8 are turned off. Therefore, the d.c. voltage V3 is not applied to the inverter.

In a tablet detection period, the DET signal attains a high level H, whereby the transistor Q1 is turned on, the transistor Q5 is turned off, and the transistor Q2 is turned off. As a result, the d.c. voltage V1 is not longer applied to the inverter. The DET signal of a high level H is inverted by the inverter 50 to attain a low level L, whereby the transistor Q6 is turned off. The transistor Q7 is turned on by the voltage divided by resistors R13 and R14 to turn o the transistor Q8. As a result, the d.c. voltage V3 is applied from the emitter of the transistor Q8 via the collector and the diode D2 to the inverter. The inverter oscillates a low voltage which is supplied to the lamp according to the d.c. voltage V3.

Because the voltage oscillated at the inverter is reduced and supplied to the lamp during a tablet coordinate detection period, the effect of noise being mixed into the tip of a pen can be reduced.

It is to be noted that the oscillation voltage of the inverter may be reduced when the pen 6 is in proximity to the liquid panel and during a tablet coordinate detection period.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A coordinate input device comprising:
    a liquid crystal panel including a liquid crystal layer between a plurality of segment electrodes and a plurality of common electrodes orthogonal to each other;
    a light source for directing light uniformly from a back side of said liquid crystal panel;
    an inverter power source for driving said light source;
    electrode driving means for driving said segment electrodes and said common electrodes;
    display control means for controlling said electrode driving means during a display period to display an image on said liquid crystal panel;
    a position detection pen for electrostatically coupling said segment electrodes and said common electrodes;
    position detection control means for controlling said electrode driving means during a position detection period set subsequent to a display period to apply a scanning voltage sequentially;
    coordinate calculation means for calculating coordinates according to an induced voltage induced at said position detection pen and the timing of applying the scanning voltage to said segment electrodes; and
    power source drive suspension means for suspending the drive of said light source by said inverter power source only during said position detection period.

2. The coordinate input device according to claim 1, wherein
    said inverter power source includes
        an oscillation transformer for oscillating in response to a d.c. voltage, and
        a first transistor for applying the d.c. voltage to said oscillation transformer; and
    said power source drive suspension means includes a second transistor for blocking the d.c. voltage supplied to said oscillation transformer by rendering said first transistor non-conductive only during said position detection period.

3. The coordinate input device according to claim 2, further comprising:
    proximity detection means for detecting proximity of said position detection pen to said liquid crystal panel,
    wherein said second transistor conducts in response to a detection output of said proximity detection means during said position detection period.

4. The coordinate input device according to claim 3, wherein said proximity detection means comprises means for detecting noise from said liquid crystal panel.

5. A coordinate input device comprising:
    a liquid crystal panel including a liquid crystal layer between a plurality of segment electrodes and a plurality of common electrodes orthogonal to each other;
    a power source for directing light uniformly from a back side of said liquid crystal panel;
    an inverter power source for driving said power source;
    electrode driving means for driving said segment electrodes and said common electrodes;
    display control means for controlling said electrode driving means during a display period for displaying an image on said liquid crystal panel;
    a position detection pen for electrostatically coupling said segment electrodes and said common electrodes;
    position detection control means for controlling said electrode driving means during a position detection period set subsequent to a display period to apply a scanning voltage sequentially;
    coordinate calculation means for calculating coordinates according to an induced voltage induced in said position detection pen and the timing of applying the scanning voltage to said segment electrodes; and
    voltage reducing means for reducing an oscillation voltage of said inverter power source only during said position detection period.

6. The coordinate input device according to claim 5, wherein
    said inverter power source includes
        an oscillation transformer for oscillating according to a d.c. voltage,
        a first transistor for applying a first d.c. voltage to said oscillation transformer, and a second for applying a second d.c. voltage lower than said first d.c. voltage to said oscillation transformer; and said voltage reducing means includes control means for carrying out control such that said first transistor is rendered conductive only during a period other than said position detection period for supplying said first d.c. voltage to said oscillation transformer, and rendering said second transistor conductive during said position detection period for supplying said second d.c. voltage to said oscillation transformer.

7. The coordinate input device according to claim 6, further comprising:

proximity detection means for detecting proximity of said position detection pen to said liquid crystal panel, wherein said control means comprises means for rendering said first transistor non-conductive and said second transistor conductive during said position detection period and in response to a detection output for said proximity detection means.

8. A method for reducing noise in a coordinate input device comprising the steps of:

placing a liquid crystal layer between a plurality of segment electrodes and a plurality of common electrodes orthogonal to each other;

directing light uniformly from a back side of said liquid crystal panel from a light source;

driving said segment electrodes and said common electrodes;

controlling said driving step during a display period to display an image on said liquid crystal panel;

electrostatically coupling said segment electrodes and said common electrodes via a position detection pen;

controlling said driving step during a position detection period set subsequent to a display period to apply a scanning voltage sequentially;

calculating coordinates according to an induced voltage induced at said position detection pen and the timing of applying the scanning voltage to said segment electrodes; and suspending said directing step only during said position detection period.

9. The method according to claim 8, wherein said directing step includes powering said light source with an oscillation transformer;

oscillating the oscillation transformer in response to a d.c. voltage, and supplying the d.c. voltage to said oscillation transformer; and said suspending step includes blocking the d.c. voltage from said supplying step only during said position detection period.

10. The method according to claim 9, further comprising:

detecting proximity of said position detection pen to said liquid crystal panel, wherein said blocking step is executed in response to a detection output of said detection step during said position detection period.

11. The method according to claim 10, wherein said detecting step includes detecting noise from said liquid crystal panel.

12. A method for reducing noise in a coordinate input device comprising the steps of:

placing a liquid crystal layer between a plurality of segment electrodes and a plurality of common electrodes orthogonal to each other;

directing light uniformly from a back side of said liquid crystal panel from a light source;

driving said segment electrodes and said common electrodes;

controlling said driving step during a display period for displaying an image on said liquid crystal panel;

electrostatically coupling said segment electrodes and said common electrodes via a position detection pen;

controlling said driving step during a position detection period set subsequent to a display period to apply a scanning voltage sequentially;

calculating coordinates according to an induced voltage induced in said position detection pen and the timing of applying the scanning voltage to said segment electrodes; and reducing power supplied by said light source only during said position detection period.

13. The method according to claim 12, wherein said directing step includes powering said light source with an oscillation transformer, oscillating the oscillation transformer in response to a d.c. voltage, supplying a first d.c. voltage to said oscillation transformer via a first transistor, and supplying a second d.c. voltage lower than said first d.c. voltage to said oscillation transformer via a second transistor; and said reducing step includes controlling said supplying of said first d.c. voltage such that said first transistor is rendered conductive only during a period other than said position detection period for supplying said first d.c. voltage to said oscillation transformer, and rendering said second transistor conductive during said position detection period for supplying said second d.c. voltage to said oscillation transformer.

14. The method according to claim 13, further comprising:

detecting proximity of said position detection pen to said liquid crystal panel, wherein said controlling step includes rendering said first transistor non-conductive and said second transistor conductive during said position detection period and in response to a detection output from said detecting step.

* * * * *